United States Patent
Keller et al.

(10) Patent No.: US 10,105,932 B2
(45) Date of Patent: Oct. 23, 2018

(54) PROCESS FOR PRODUCING LAMINATED GLASS COMPOSITES WITH EMBEDDED ELECTRICALLY CONDUCTIVE STRUCTURES

(71) Applicant: KURARAY EUROPE GMBH, Hattersheim (DE)

(72) Inventors: Uwe Keller, Bonn (DE); Marco Greb, Linsengericht (DE)

(73) Assignee: KURARAY EUROPE GMBH, Hattersheim (DE)

(*) Notice: Subject to any disclaimer, the term of this patent is extended or adjusted under 35 U.S.C. 154(b) by 226 days.

(21) Appl. No.: 15/036,466

(22) PCT Filed: Nov. 27, 2014

(86) PCT No.: PCT/EP2014/075860
§ 371 (c)(1),
(2) Date: May 13, 2016

(87) PCT Pub. No.: WO2015/078993
PCT Pub. Date: Jun. 4, 2015

(65) Prior Publication Data
US 2016/0288459 A1     Oct. 6, 2016

(30) Foreign Application Priority Data
Nov. 29, 2013 (EP) .................... 13195211

(51) Int. Cl.
*B32B 17/10* (2006.01)
*B32B 37/14* (2006.01)

(52) U.S. Cl.
CPC .... *B32B 17/10036* (2013.01); *B32B 17/1022* (2013.01); *B32B 17/10192* (2013.01); *B32B 17/10201* (2013.01); *B32B 17/10275* (2013.01); *B32B 17/10761* (2013.01); *B32B 37/14* (2013.01); *B32B 2250/40* (2013.01); *B32B 2307/202* (2013.01); *B32B 2307/412* (2013.01); *B32B 2605/006* (2013.01)

(58) Field of Classification Search
CPC ................................. B32B 17/10036
See application file for complete search history.

(56) References Cited

U.S. PATENT DOCUMENTS

| | | | |
|---|---|---|---|
| 7,312,275 B2 | 12/2007 | Papenfuhs et al. | |
| 7,358,304 B2 | 4/2008 | Papenfuhs et al. | |
| 7,511,096 B2 | 3/2009 | Papenfuhs et al. | |
| 7,528,192 B2 | 5/2009 | Papenfuhs et al. | |
| 9,028,644 B2 | 5/2015 | Keller | |
| 2013/0050983 A1* | 2/2013 | Labrot | B32B 17/10 362/84 |
| 2013/0323517 A1* | 12/2013 | Kitano | B32B 17/10633 428/437 |
| 2014/0224423 A1* | 8/2014 | Keller | B32B 17/10036 156/313 |

FOREIGN PATENT DOCUMENTS

| | | |
|---|---|---|
| CA | 2 388 107 A1 | 5/2001 |
| EP | 1 235 683 B1 | 9/2002 |
| EP | 1 527 107 B1 | 5/2005 |
| EP | 1 606 325 | 12/2005 |
| EP | 2 409 833 A1 | 1/2012 |
| EP | 2 767 393 A1 | 8/2014 |
| WO | 03/020776 A1 | 3/2003 |
| WO | 2004/063231 A1 | 7/2004 |
| WO | 2010/030413 A1 | 3/2010 |

* cited by examiner

*Primary Examiner* — Daniel H Lee
(74) *Attorney, Agent, or Firm* — Brooks Kushman P.C.

(57) ABSTRACT

Production of glass laminates containing electrically conductive structures is facilitated by including the electrically conductive structures on a first polyvinyl acetate film with low or no plasticizer content, and employing a second polyvinyl acetal film with a high plasticizer content.

20 Claims, No Drawings

PROCESS FOR PRODUCING LAMINATED GLASS COMPOSITES WITH EMBEDDED ELECTRICALLY CONDUCTIVE STRUCTURES

CROSS REFERENCE TO RELATED APPLICATIONS

This application is the U.S. National Phase of PCT Appln. No. PCT/EP2014/075860 filed Nov. 27, 2014, which claims priority to European Application No. 13195211.1 filed Nov. 29, 2013, the disclosures of which are incorporated in their entirety by reference herein.

BACKGROUND OF THE INVENTION

1. Field of the Invention

The present invention relates to a method for the production of laminated glass panes with embedded electrically conductive structures using an interlayer film based on polyvinylacetal having thereon electrically conductive structures.

2. Description of the Related Art

For the production of laminated glass panes with electrically conductive structures, such as heater wires or antennae, methods are customary in which metal filaments are either initially melted on the surface of a normal PVB film or sewn into it, or the electrically conductive structures are applied by screen printing and successive firing on one of the inwards oriented glass surfaces on the laminate. In both cases there is the risk of economic losses, if errors occur during the application on the normal PVB film or when applied onto a prepared glass pane. In the first case, the PVB film, in the second case, the glass, can no longer be used for lamination. Direct printing of PET films with electrically conductive structures, however, is partially established and for example almost invisible heating elements, sensor arrays, etc. can be formed thereon. A leading company in this field is, for example, PolyIC of Fürth, Germany. The disadvantage of a required integration of these structures with electrically conductive printed PET films in laminated glass composites, however, is that always at least 3 layers of film (1×functionalized PET, 2×PVB film) must be used, since PET cannot be melted directly with the functionalized side or the backside on a glass surface.

Another disadvantage is the increased complexity of film packaging, which causes a complication of the film preparation by the processor when combining the feature of "electrically conductive structures" with other functional features such as "acoustic damping", "band filter", "wedge-shaped thickness profile", "color hue".

The production of laminated glass composites with conductive layers, which are incorporated into the entire surface of the laminate is, for example, known from EP 2409833. WO 2010/030413 discloses electrically conductive interlayer films which are mounted between two electrodes. This results in a high consumption of material in the conductive layers in addition to a reduced transparency of the laminate.

SUMMARY OF THE INVENTION

An object of the present invention is therefore to provide, in an economical way, laminated glass composites with arbitrary electrically conductive structures within the laminated glass. It has now been surprisingly found that thin films based on polyvinylacetal with low or zero plasticizers, having thereon discrete, electrically conductive structures can be melted directly on one of the glass surfaces, in a typical manufacturing process for laminated glass composites. Then, in combination with at least one layer of plasticized polyvinylacetal, the usual required safety properties of laminated glass composites can still be obtained.

DETAILED DESCRIPTION OF THE PREFERRED EMBODIMENTS

The invention therefore provides a method for the production of laminated glass composites with electrically conductive structures by bonding two transparent panes with at least one film A and at least one film B, characterized in that films A and B are positioned between the two transparent panes and bond these to each other, wherein film A contains a polyvinylacetal PA and 0 to 16% by weight of one or more plasticizers WA as well as discrete, electrically conductive structures, and film B contains a polyvinylacetal PB and at least 16% by weight of at least one plasticizer WB.

In the present case, discrete, electrically conductive structures do not comprise flat layers but separately identifiable structures such as conductor tracks, wires, networks built with these tracks or wires, dots, and combinations thereof. The discrete electrically conductive structures may be applied to the surface of films A or may be embedded in them.

The transparent panes may be identical or different, and may be made of glass, PMMA or polycarbonate. In the following the terms "glass pane" or "glass surface" are used as synonyms of "transparent pane" or "surface of the transparent pane".

The inventive method can be performed by positioning on intermediate layer on a transparent pane, by applying film A on a transparent pane on which film B and a second transparent pane are placed. Alternatively, it is possible to position film B on a transparent pane, onto which film A and a second transparent pane are placed.

Preferably the discrete electrically conductive structures comprise metals such as silver, copper, gold, indium, zinc, iron, and aluminum. Alternatively or in combination, semiconductor materials may be disposed in or on film A. Furthermore, carbon-based conductive materials may be used, such as graphite, CNT (carbon nanotubes) or graphene.

Films A have electrically conductive structures on one or both surfaces.

The electrically conductive structures can be generated by different types of printing processes such as screen printing, flexoprinting or gravure printing, vapor deposition, sputtering, or electrodeposition on the surface of film A. In printing processes, corresponding inks are used which can be dried, or thermally or photonically cured before lamination. The electrically conductive structures may also be worked out in their final form through the use of lasers or other processing means (engraving, etching) from an initially coarser structure on film A.

In case of printing methods ("Printed Electronics"), the inks or printing colors used contain conductive particles. These may be particles composed of metals such as gold, silver, copper, zinc, iron or aluminum, as well as metal-coated materials such as silver plated glass fibers, glass beads and conductive carbon black, carbon nanotubes, graphite or graphene.

Furthermore, particles of semiconductors, for example conductive metal oxides such as indium-doped tin oxide, doped zinc oxide, and antimony-doped tin oxide may be used.

The electrically conductive structures can generally be used for electromagnetic shielding of frequency fields, for generating electrical circuits such as printed circuit tracks or transmitting and/or receiving antennas, as well as other functions. Heaters can, for instance, be incorporated in the glass composite, antennas can, for example, be used in the automotive sector for receiving radio waves or in car-to-car communication.

The electrically conductive structures of the laminates according to the invention can also be composed of touch sensors, which enables the production of interactive laminated glass panes. For example, information input to the laminated glass pane (for example, a windshield or side window of a car or the sliding glass of a door) can be used for access control.

In multilayer structures of electronic elements, i.e. conductive and dielectric structures, whole electronic circuits or components can be further applied. These include, inter alia, transistors, resistors, chips, sensors, displays, light emitting diodes (OLEDs, for example) and/or smart labels.

The electrically conductive structures may be so small that they can only be barely recognized with the naked eye. This happens at widths of 1 to 30 µm, preferably 1 to 20 µm, and most preferably 1 to 15 µm. In particular, in flat heating fields, the width of the filaments is less than 25 µm. Heating panels can also be applied only locally, on an upper surface of a windshield in front of an optical sensor system, for example.

Film A may have a smaller surface area than film B, so that film B is, in a partial region, in direct contact with at least one glass pane. This results in the advantage that film A can be flexibly positioned with its electrically conductive structure anywhere on an automotive glazing without filling the entire pane.

The electrically conductive structures used in the invention preferably have thicknesses in the range of 0.1-50 µm, more preferably in the range of 0.5 to 20 µm, and most preferably in the range of 1-10 µm.

In the following, the "initial state" is the state of films A and B prior to lamination, i.e. in a still separated condition.

Films A and B may contain, in the initial state prior to lamination of the layers as well as in the intermediate layer stack in the composite glass laminate, a single plasticizer, or mixtures of plasticizers of the same or different composition. A different composition relates both to the type of plasticizers as well as their proportion in the mixture. Preferably, after lamination, that is in the finished laminated glass, film A and film B contain the same plasticizer WA and WB. In a preferred variant, however, film A contains in its initial state no plasticizer, and after lamination contains the plasticizer WB.

According to the invention, plasticizer-containing films B contain, in the initial state prior to lamination of the layers, at least 16% by weight, such as 16.1-36.0% by weight, preferably 22.0-32.0% by weight, and especially 26.0-30.0% by weight of plasticizer.

Films A, used in the invention, in the initial state prior to lamination of the layers, contain, in order of increasing preference, less than 16% by weight (such as 15.9% by weight), less than 12% by weight, less than 8% by weight, less than 6% by weight, less than 4% by weight, less than 3% by weight, less than 2% by weight, less than 1% by weight, of plasticizer WA in each case with a lower limit of 0% by weight. Preferably, the low-plasticizer films A contain 0.0-8% by weight of plasticizer WA.

In the inventive method, in the initial state prior to lamination of the layers, film A has a thickness less than 20%, preferably less than 15%, and more preferably less than 10% of the thickness of the film or films B. The thickness of film A includes the electrically conductive structure.

The thickness of film A, in the initial state prior to lamination of the layers, is 10-150 µm, preferably 20-120 µm, more preferably 30-100 µm, yet more preferably 40-80 µm, and most preferably 50-70 µm. In laminated glass the thickness of film A increases by migration of plasticizers from film B.

Film A is separately manufactured from film B (e.g. by extrusion, and it has either no plasticizer or such a small percentage of plasticizer that, in the production and further processing, under mechanical stress, film A neither stretches too much nor has an excessive stickiness ("tack").

The thickness of film B, in the initial state, is 450-2500 µm, preferably 600-1000 µm, more preferably 700-900 µm. When using multiple films B, the same applies for the total thickness. If films B are stretched and/or additionally curved, conforming to the shape of a pane (for example, a windscreen), before the preparation of the sandwich structure to be laminated, the indicated thicknesses can be further reduced at the time of lamination by up to 20%.

At least one thin film A having an electrically conductive structure is oriented with respect to a glass surface of the composite glass laminate of the invention. The film A may in this case be applied on the glass surface with the surface having the electrically conductive structure or the surface without the electrically conductive structures.

The transparent panes can be interconnected by a layer sequence of three or more films, for example film A/film B/film A or film B/film A/film B.

Thus, it is possible to apply a respective film A on both glass surfaces providing a laminated glass composite with a layer sequence of glass/film A/film B/film A/glass. Here, the decoration of films A may be the same or different. For example, while one of the sheets A may have the electrically conductive structure, the second film A may have heat absorbing layers or other layers having optical functions.

In the case of automotive glazing, for aesthetic reasons and durability, it is not preferred to seal the edges of the laminated glass composites with sealants. This favors the susceptibility of such glazing towards formation of edge defects such as peeling among the layers (delamination) or corrosion or chemical modifications of the electrically conductive structure extending to the edge of the laminate.

In the novel method, the low-plasticizer film A can be cut to size and positioned so that it does not extend everywhere, particularly up to the edge of the laminate in the laminated glass composite. In particular, film A may be smaller than at least one glass pane in the edge region by at least 1 mm so that film B, in this edge region, is in direct contact with at least one glass pane.

Furthermore, in the initial state, the thin, low-plasticizer or plasticizer-free film A can be perforated before inserting it into the glass/film sandwich, so that it has recesses such as openings, holes, or slots in any geometrical pattern.

Thus, film A may have at least one recess, so that, through this recess, film B is in direct contact with at least one glass pane. After bonding to the finished laminated glass, film B with a higher plasticizer content in the initial state is bonded at these locations with the glass panes without interruption. In particular, such recesses can be obtained at positions of the laminated glass, behind which optics, antenna elements would otherwise be adversely affected in their function by an electrically conductive structure.

The films A and B used in the invention comprise polyvinylacetals which are produced by acetalization of polyvinyl alcohol or ethylene-vinyl alcohol copolymers.

The films may contain polyvinylacetals, each with a different polyvinyl alcohol content, acetalisation degree, residual acetate content, ethylene content, molecular weight or different chain lengths of the aldehyde in the acetal groups.

In particular, the aldehyde or keto-compounds used for producing the polyvinylacetals may be linear or branched (i.e., of the "n" or "iso" type) having 2 to 10 carbon atoms, which leads to corresponding linear or branched acetal groups. The polyvinylacetals are accordingly called "polyvinyl (iso) acetals" or "polyvinyl (n) acetals".

The polyvinyl(n)acetal used in the invention results primarily from the reaction of at least one polyvinyl alcohol with one or more aliphatic unbranched keto-compounds with 2 to 10 carbon atoms. Preferably, to this end, n-butyraldehyde is used.

The polyvinyl alcohols or ethylene-vinyl alcohol copolymers used to prepare the polyvinylacetals in the films A or B, can be identical or different, e.g. may be pure or may be a mixture of polyvinyl alcohols or ethylene-vinyl alcohol copolymers with different degrees of polymerization or degrees of hydrolysis.

The polyvinyl acetate content of the polyvinylacetals in the films A or B can be adjusted by using a polyvinyl alcohol or ethylene-vinyl alcohol copolymer saponified to a corresponding degree. Due to the content of polyvinyl acetate, polarity of the polyvinylacetal is affected, thus changing the plasticizer compatibility and the mechanical strength of each layer. It is also possible to carry out the acetalization of the polyvinyl alcohols or ethylene-vinyl alcohol copolymers with a mixture of various aldehydes or keto-compounds.

Preferably, films A or B contain polyvinylacetals having a same or different proportion of polyvinyl acetate groups, relative to the layers, for example from 0.1 to 20 mol %, preferably 0.5 to 3 mol % or 5-8 mol %.

The polyvinyl alcohol content of the polyvinylacetal PA, in the lower-plasticized film A in the initial state, can be, in order of increasing preference, 6-26% by weight, 8-24% by weight, 10-22% by weight, 12-21% by weight, 14-20% by weight, 16-19% by weight, and most preferably 16 to 21% by weight or 10 to 16% by weight.

The polyvinyl alcohol content of the polyvinylacetals PB of the higher-plasticizer film B in the initial state can be, in order of increasing preference, 14-26% by weight, 16-24% by weight, 17-23% by weight and most preferably from 18 to 21% by weight.

Films A or B preferably contain uncrosslinked polyvinylacetal(s). The use of crosslinked polyvinylacetals is also possible. Methods for crosslinking polyvinylacetals are described, for example, in EP 1527107 B1 and WO 2004/063231 A1 (thermal self-crosslinking of carboxy group-containing polyvinylacetals), EP 1606325 A1 (polyvinylacetals crosslinked with polyaldehydes) and WO 03/020776 A1 (polyvinylacetals crosslinked with glyoxylic acid).

The films A and/or B used in the invention can contain, as plasticizers WA and WB, respectively one or more compounds selected from the following groups:

Esters of polyhydric aliphatic or aromatic acids, such as dialkyladipate, dihexyladipate, dioctyladipate, hexylcyclohexyladipate, mixtures of heptyl and nonyladipates, diisononyladipate, heptylnonyladipate, and esters of adipic acid with cycloaliphatic or ether compounds containing ester alcohols, dialkylsebacate as dibutylsebacate and esters of sebacic acid with cycloaliphatic or ether compounds containing ester alcohols, esters of phthalic acid such as butyl benzyl phthalate or bis-2-butoxyethylphthalate;

Esters or ethers of polyhydric aliphatic or aromatic alcohols or oligoether glycols with one or more unbranched or branched aliphatic or aromatic substituents, such as esters of glycerine, di-, tri- or tetraglycols with linear or branched aliphatic or cycloaliphatic carboxylic acids; examples of the latter group are diethyleneglycol-bis-(2-ethylhexanoate), triethyleneglycol-bis-(2-ethylhexanoate), triethyleneglycol-bis-(2-ethylbutanoate), tetraethyleneglycol-bis-n-heptanoate, triethyleneglycol-bis-n-heptanoate, triethyleneglycol-bis-n-hexanoate, tetraethylenglycoldimethylether and/or dipropylene glycol benzoate;

Phosphates with aliphatic or aromatic ester-alcohols such as tris(2-ethylhexyl)phosphate (TOF), triethylphosphate, diphenyl-2-ethylhexyl phosphate, and/or tricresylphosphate; and Esters of citric acid, succinic acid and/or fumaric acid.

By definition, plasticizers are high-boiling organic liquids. For this reason also other types of organic liquids having a boiling point higher than 120° C. may be used as a plasticizer.

Most preferably, the films A in variants in which at initial conditions a plasticizer WA is present as well as film(s) B, contain as a plasticizer 1,2-cyclohexane dicarboxylic acid diisononyl ester (DINCH), or triethylene glycol-bis-2-ethylhexanoate ("3GO" and "3G8").

In addition, films A and B may further contain other components, such as residual amounts of water, UV-absorbers, antioxidants, adhesion regulators, optical brighteners or fluorescent additives, stabilizers, colorants, processing aids, organic or inorganic nanoparticles, fumed silica, and/or surface-active substances. In particular, film B can have, as adhesion regulators, 0.001 to 0.1% by weight of alkali and/or alkaline earth metal salts of carboxylic acids.

For suppression of corrosion effects of the electrically conductive structures introduced by film A in the laminated glass, in particular when using metallic conductor materials such as silver, it may be helpful to provide a corrosion inhibitor in the finished laminate. Preferably, the corrosion inhibitors may be included in film B prior to lamination and may migrate during and after bonding with film A by diffusion into the thinner film A or into the area of its coating.

Alternatively, before lamination, the anti-corrosion agent may already be included in film A. Preference is given to corrosion inhibitors in percentages of 0.005-5% by weight in film B and/or A. Preference is given to the use of unsubstituted or substituted benzotriazoles as corrosion inhibitors.

To avoid corrosion of the conductive structures, film A preferably has less than 150 ppm of chloride ions and/or nitrate ions and/or sulfate ions.

Thus, the chloride content of film A may be less than 150 ppm, preferably less than 100 ppm and in particular less than 50 ppm. Ideally, the chloride content of film A is less than 10 ppm or even 0 ppm.

The nitrate content of film A film may be less than 150 ppm, preferably less than 100 ppm, and particularly less than 50 ppm. Ideally, the nitrate content of film A is less than 10 ppm or even 0 ppm.

The sulphate content of film A may be less than 150 ppm, preferably less than 100 ppm and in particular less than 50 ppm. Ideally, the sulphate content of film A is less than 10 ppm or even 0 ppm.

In addition, film A may comprise more than 0 ppm magnesium ions. Preferably, the magnesium content is more than 5 ppm, most preferably 10 ppm, especially 5-20 ppm.

It is possible, according to the invention, to first melt film A over the entire surface or locally onto a glass pane at elevated temperature and then cover with film B. Alternatively, the films A and B can be positioned together between two panes of glass and fused at elevated temperature.

The adhesive bonding of the transparent panes, i.e. the lamination step for producing the laminated glass, is preferably carried out so that films A and B are positioned between two glass panes and the thus-prepared laminate is compressed under elevated or reduced pressure and elevated temperature to form a laminate.

For lamination of the laminate body, methods known to those skilled in the art can be used with or without previous preparation of a pre-laminate.

So-called autoclave processes are carried out at an elevated pressure of approximately 10 to 15 bar and temperatures of 100 to 145° C. over a period of about 2 hours. Vacuum bag—or vacuum ring processes, for example according to EP 1,235,683 B1 operate at about 200 mbar and 130 to 145° C.

There may also be used so-called vacuum laminators. These consist of a heated and evacuated chamber, where laminated glazing can be laminated in 30-60 minutes. Reduced pressures from 0.01 to 300 mbar and temperatures from 100 to 200° C., in particular 130-160° C., have been proven successful in practice.

In the simplest case, for manufacturing the composite laminated glass, film A or B is positioned on a glass pane and to this end, synchronously or subsequently, the further film B or A is positioned. Thereafter, the second glass pane is applied and forms a glass film composite. Excess air can then be removed using any pre-composite method known to the skilled in the art. Here, a first light bonding between the layers and with the glass already takes place.

The glass film composite can be finally subjected to an autoclave process. Preferably, film A is positioned on the first glass pane and is covered with the thicker film B, before the second glass pane is placed. The method can be performed in many conceivable and essentially practicable variants. For example, film A is simply removed from a roll of appropriate width while film B is previously cut to the size of the composite glass. This is especially advantageous in the case of windshields and other automotive glazing areas. In this case it is particularly advantageous to additionally stretch the thicker film B before cutting to size. This allows for a more economical use of the film or, in the event that film B has a color wedge, the conforming of the curvature to the upper edge of the pane.

In the automotive sector, in particular for the production of windshields, films are often used which have a so-called color ribbon at the top. For this purpose, either the upper part of the films A and B may be co-extruded with a correspondingly colored polymer melt or, in a multi-layer system, one of films A and B may have areas of different color. In the present invention this can be realized by complete or partial coloring of at least one of films A and B.

According to the invention, films B may therefore have a color wedge, which has already been adapted, in an upstream process step, to the geometry of a windshield.

It is also possible that films B have a wedge-shaped thickness profile. Thus, the laminated glass composite of the invention achieves, even with a plane-parallel thickness profile of film A, a wedge-shaped thickness profile, and can be used in car windshields for HUD displays.

In the simplest case, film B is a commercially available PVB film with or without a ribbon and with or without a wedge-shaped thickness profile. Also, film B can be used with dispersed nanoparticles and colored films for IR protection. Of course, film B can also be a film with acoustic function, so that by combining with a film A improved sound insulation properties are obtained. Obviously, film B can already combine several of these features in itself.

The preparation of the thin films A is generally carried out by extrusion using a cast film line or as a blown film. Surface roughness can be obtained by controlled flow breaks or in a cast film process, additionally, by using a structured chill roll.

In addition, to an already produced film a regular, non-stochastic roughness may be impressed by using an embossing process between at least one pair of rolls. Preferably, films used in the invention have a one-sided surface structure with a roughness Rz of 0 to 25 μm, more preferably an Rz of 1-20 μm, yet more preferably an Rz of 3-15 μm and especially an Rz of 4-12 μm. It is particularly preferred that the side of film coming into contact with the glass pane has a surface roughness Rz of less than 20% of its thickness. The surface provided with the electrically conductive structure preferably comprises, before application of the coating, a particularly low surface roughness. In particular, in this case, the roughness parameter Ra is less than 3 μm and Rz is less than 5 μm.

The invention claimed is:

1. A method for the production of laminated glass composites with electrically conductive structures, comprising bonding two transparent panes with at least one film A and at least one film B positioned between the two transparent panes, film A comprising a polyvinylacetal PA, 0 to 16% by weight of plasticizer WA, and discrete, electrically conductive structures, and film B comprising a polyvinylacetal PB and at least 16% by weight of at least one plasticizer WB, wherein the discrete, electrically conductive structures have a thickness of 0.1 to 50 μm.

2. The method of claim 1, wherein the discrete, electrically conductive structures are applied to the surface of at least one film A.

3. The method of claim 1, wherein the discrete, electrically conductive structures are one or more of an antenna, a heater, or a touch sensor.

4. The method of claim 1, wherein film A comprises a polyvinylacetal PA with a content of vinyl alcohol groups of 6 to 26% by weight and film B comprises a polyvinylacetal PB having a content of vinyl alcohol groups of 14 to 26% by weight.

5. The method of claim 1, wherein film A and/or film B contain 0.005-5% by weight of a corrosion inhibitor.

6. The method of claim 1, wherein film A has a smaller surface area than film B, such that film B is, in a partial region, in direct contact with at least one transparent pane.

7. The method of claim 6, wherein film A in an edge region is at least 1 mm smaller than at least one glass pane, such that film B in this edge region is in direct contact with at least one glass pane.

8. The method of claim 1, wherein film A has at least one recess, such that film B, through this recess, is in direct contact with at least one glass pane.

9. The method of claim 1, wherein film B comprises at least two partial films B' and B" which have different plasticizer contents.

10. The method of claim 1, wherein film B has a wedge-shaped thickness profile.

11. The method of claim 1, wherein film A comprises less than 150 ppm of chloride ions, nitrate ions, and/or sulfate ions.

12. The method of claim 1, wherein film A comprises more than 0 ppm of magnesium ions.

13. The method of claim 1, wherein the transparent panes are interconnected by a layer sequence film A/film B/film A.

14. The method of claim 1, wherein the transparent panes are interconnected by a layer sequence film B/film A/film B.

15. The method of claim 1, wherein at least one electrically conductive structure is a metal conducting structure.

16. The method of claim 15, wherein the metal is selected from the group consisting of silver, copper, gold, indium, zinc, iron, aluminium, and mixtures thereof.

17. A method for the production of laminated glass composites with electrically conductive structures, comprising bonding two transparent panes with at least one film A and at least one film B positioned between the two transparent panes, film A comprising a polyvinylacetal PA, 0 to 16% by weight of plasticizer WA, and discrete, electrically conductive structures, and film B comprising a polyvinylacetal PB and at least 16% by weight of at least one plasticizer WB, wherein the discrete, electrically conductive structures have a width of 1-30 μm.

18. The method of claim 17, wherein at least one electrically conductive structure is a metal conducting structure.

19. The method of claim 18, wherein the metal is selected from the group consisting of silver, copper, gold, indium, zinc, iron, aluminium, and mixtures thereof.

20. The method of claim 17, wherein the discrete, electrically conductive structures are one or more of an antenna, a heater, or a touch sensor.

* * * * *